(12) United States Patent
Doering et al.

(10) Patent No.: US 8,397,499 B2
(45) Date of Patent: Mar. 19, 2013

(54) METHODS AND SYSTEMS FOR TURBOCHARGER CONTROL

(75) Inventors: Jeffrey Allen Doering, Canton, MI (US); John Eric Rollinger, Sterling Heights, MI (US); De-Shiou Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 736 days.

(21) Appl. No.: 12/546,297

(22) Filed: Aug. 24, 2009

(65) Prior Publication Data
US 2011/0041493 A1 Feb. 24, 2011

(51) Int. Cl.
F02D 23/00 (2006.01)
F02B 33/44 (2006.01)
F02B 33/00 (2006.01)
F02B 37/00 (2006.01)

(52) U.S. Cl. ............... 60/602; 60/611; 60/612; 123/562

(58) Field of Classification Search .................. 60/612, 60/611, 602; 123/562
See application file for complete search history.

(56) References Cited

U.S. PATENT DOCUMENTS

| | | | | |
|---|---|---|---|---|
| 4,263,826 A | | 4/1981 | Hartz et al. ...................... 74/868 |
| 4,709,552 A | * | 12/1987 | Rutschmann et al. .......... 60/612 |
| 5,226,351 A | | 7/1993 | Matsuoka et al. ............... 74/866 |
| 5,228,368 A | | 7/1993 | Kato et al. ....................... 74/866 |
| 5,277,029 A | * | 1/1994 | Kidokoro et al. ............... 60/612 |
| 5,845,495 A | * | 12/1998 | Schray et al. ................... 60/612 |
| 6,161,384 A | * | 12/2000 | Reinbold et al. ................ 60/602 |
| 6,202,415 B1 | * | 3/2001 | Lohmann et al. ............... 60/612 |
| 6,224,021 B1 | * | 5/2001 | Tanaka .......................... 244/221 |
| 6,253,551 B1 | * | 7/2001 | Lohmann et al. ............... 60/612 |
| 6,692,406 B2 | | 2/2004 | Beaty .............................. 477/32 |
| 6,801,846 B1 | * | 10/2004 | Rodriguez et al. ............. 60/612 |
| 7,066,157 B2 | * | 6/2006 | Takahashi et al. .............. 60/612 |
| 7,380,401 B2 | * | 6/2008 | Henn et al. ...................... 60/612 |
| 7,607,302 B2 | * | 10/2009 | Fry et al. ......................... 60/612 |
| 7,640,794 B2 | * | 1/2010 | Farmer ....................... 73/114.39 |
| 7,926,270 B2 | * | 4/2011 | Weaver et al. .................. 60/612 |
| 7,958,730 B2 | * | 6/2011 | Stewart ............................ 60/612 |
| 8,001,782 B2 | * | 8/2011 | Pursifull ......................... 60/612 |
| 2004/0118117 A1 | * | 6/2004 | Hartman et al. ................ 60/602 |
| 2008/0276614 A1 | | 11/2008 | Shu et al. ........................ 60/602 |
| 2011/0023479 A1 | * | 2/2011 | Sun et al. ........................ 60/602 |
| 2011/0098876 A1 | * | 4/2011 | Burkhardt et al. ............... 701/29 |

FOREIGN PATENT DOCUMENTS

| | | | |
|---|---|---|---|
| EP | 1557549 A2 | * | 7/2005 |
| JP | 03275949 A | * | 12/1991 |
| JP | 05005420 A | * | 1/1993 |

OTHER PUBLICATIONS

Doering, Jeffrey et al., "Methods and Systems for Turbocharger Control," U.S. Appl. No. 12/546,334, filed Aug. 24, 2009, 31 pages.

* cited by examiner

*Primary Examiner* — Thai Ba Trieu
(74) *Attorney, Agent, or Firm* — Julia Voutyras; Alleman Hall McCoy Russell & Tuttle LLP

(57) ABSTRACT

Methods are provided for controlling a turbocharged engine having a throttle and a turbocharger. One example method comprises, moving the throttle during boosted conditions, separating out effects on the throttle inlet pressure into a first portion corresponding to disturbances caused by the movement of the throttle, and a second, remaining, portion. The method further comprises adjusting the turbocharger based on the second portion and not the first portion.

20 Claims, 5 Drawing Sheets

610 separating out effects on the throttle inlet pressure includes transforming throttle inlet pressure sensor data (e.g., TIP inputs to blocks 320 and 312 of FIG. 3) and measured flow data (e.g., compressor flow input to block 320, exhaust mass flow input to block 314, and compressor flow input to block 312 of FIG. 3) into a wastegate command signal (e.g., wg_dc output from block 308 of FIG. 3) sent to the wastegate

FIG. 6

710 moving the throttle in response to a temporary torque reduction request generated by one or more of a transmission shift or an overspeed condition (e.g., see FIG. 3 at 302)

FIG. 7

METHODS AND SYSTEMS FOR TURBOCHARGER CONTROL

FIELD

The present application relates to methods and systems for feedback and feed-forward control of an engine turbocharger.

BACKGROUND AND SUMMARY

Engines with turbochargers may use active control of the turbocharger, such as via a wastegate, intake throttle, a compressor bypass, etc., to improve engine performance and thus vehicle driveability.

Various approaches are known for controlling such engine systems based on a desired throttle inlet pressure (TIP), where the throttle inlet pressure is downstream of the turbocharger compressor, and upstream of the throttle, in the engine air inlet. However, the inventors herein have recognized limitations with such approaches.

One example approach requires that the throttle be fixed at wide open when performing boost control with the wastegate. As such, this approach eliminates the potential disturbances from the throttle, at the expense of performance and driveability improvements that can be gained by using the faster throttle controller to manage engine airflow. With the throttle disturbances eliminated, TIP feedback may be more consistent, but with a slower response time and increased error. This approach also results in a reduced loss across the throttle, which is beneficial for steady-state fuel economy.

Another example approach requires TIP to be scheduled higher than necessary to achieve a desired airflow and reduce the magnitude of throttle disturbances on TIP. This approach does not solve the TIP control issues, but manages them at the expense of steady-state fuel economy because of persistent losses across the throttle that are required to provide this partial insulation of TIP from throttle disturbances. This approach does, however, offer potential driveability and response benefits due to always intending to have excess pressure upstream of the throttle (with a fuel economy penalty).

The apparent paradox between achieving high steady state fuel economy and improved driveability may be at least partially addressed by a method of controlling a turbocharged engine having a throttle and an adjustable turbocharger (e.g., via a wastegate, variable geometry, variable nozzle, etc.) One example method comprises, moving the throttle during boosted conditions, separating out effects on the throttle inlet pressure into a first portion corresponding to disturbances caused by the movement of the throttle, and a second, remaining, portion, and adjusting the turbocharger based on the second portion and not the first portion.

In this way, it is possible to enable concurrent throttle and turbocharger control for controlling overall engine airflow and torque output, while still enabling the reduced fuel economy and improved driveability. For example, because movement of the throttle can be used, at least under some conditions, to control engine airflow during boosted conditions, it is possible to retain faster torque increases during such conditions, since boost can be maintained. In other words, torque can be temporarily reduced by reducing opening of the throttle while maintaining the turbocharger operation (e.g., without increasing opening of the wastegate), so that when the throttle opening increases, boost is already present and a rapid torque increase is achieved.

In another embodiment, the method comprises, during a boosted condition, adjusting the throttle, and during said boosted condition, adjusting the turbocharger in response to a desired turbocharger power, and an actual turbocharger power trajectory and speed trajectory, including turbocharger acceleration.

In this way, it is possible to structure a control of the turbocharger and engine airflow so that both throttle adjustment and turbocharger adjustment is coordinated to one another and do not counteract each other.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 6 and 7 show example operations.

DETAILED DESCRIPTION

Figure 1:
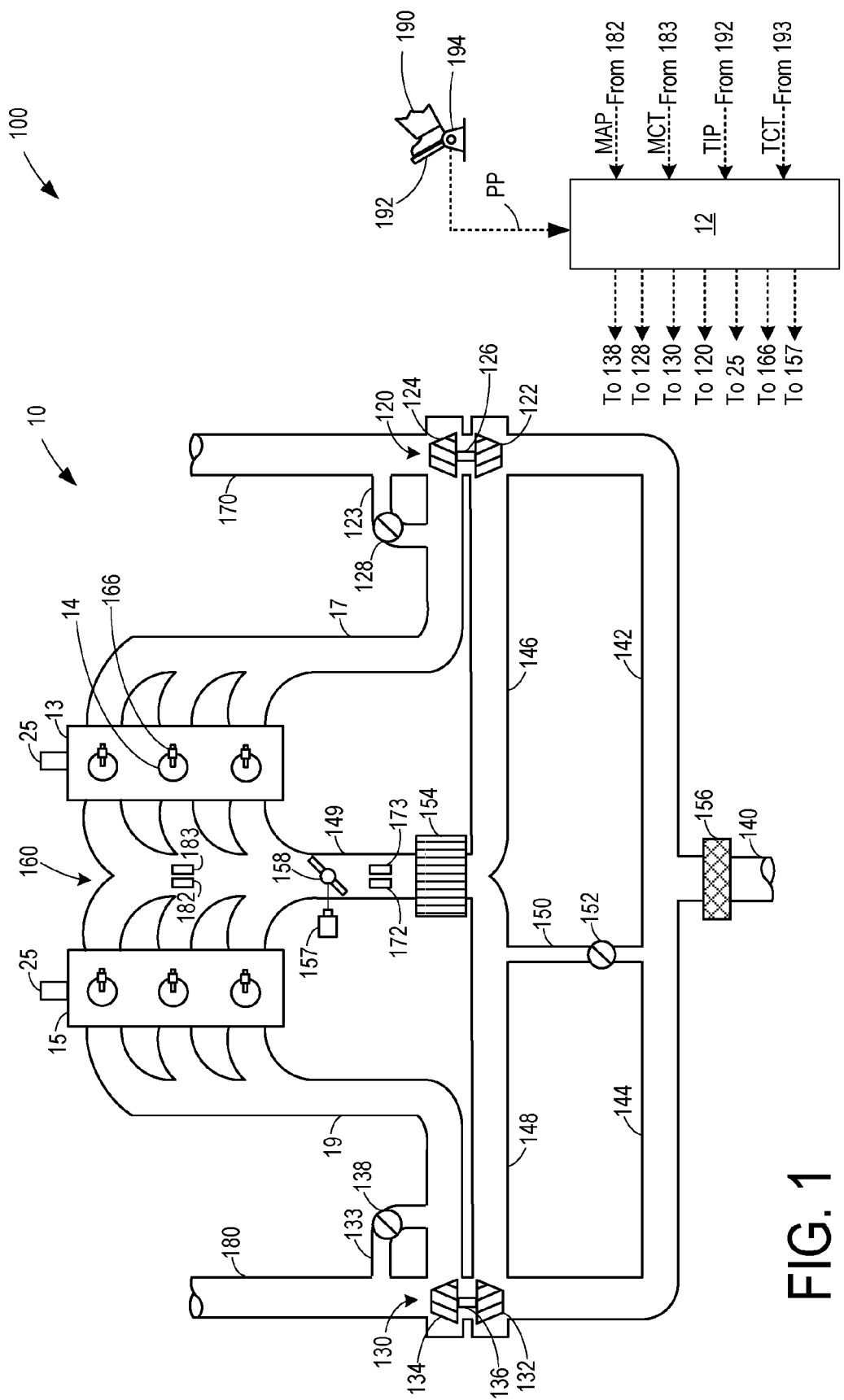
FIG. 1 shows a schematic depiction of an example engine system including twin turbochargers.
Figure 2:
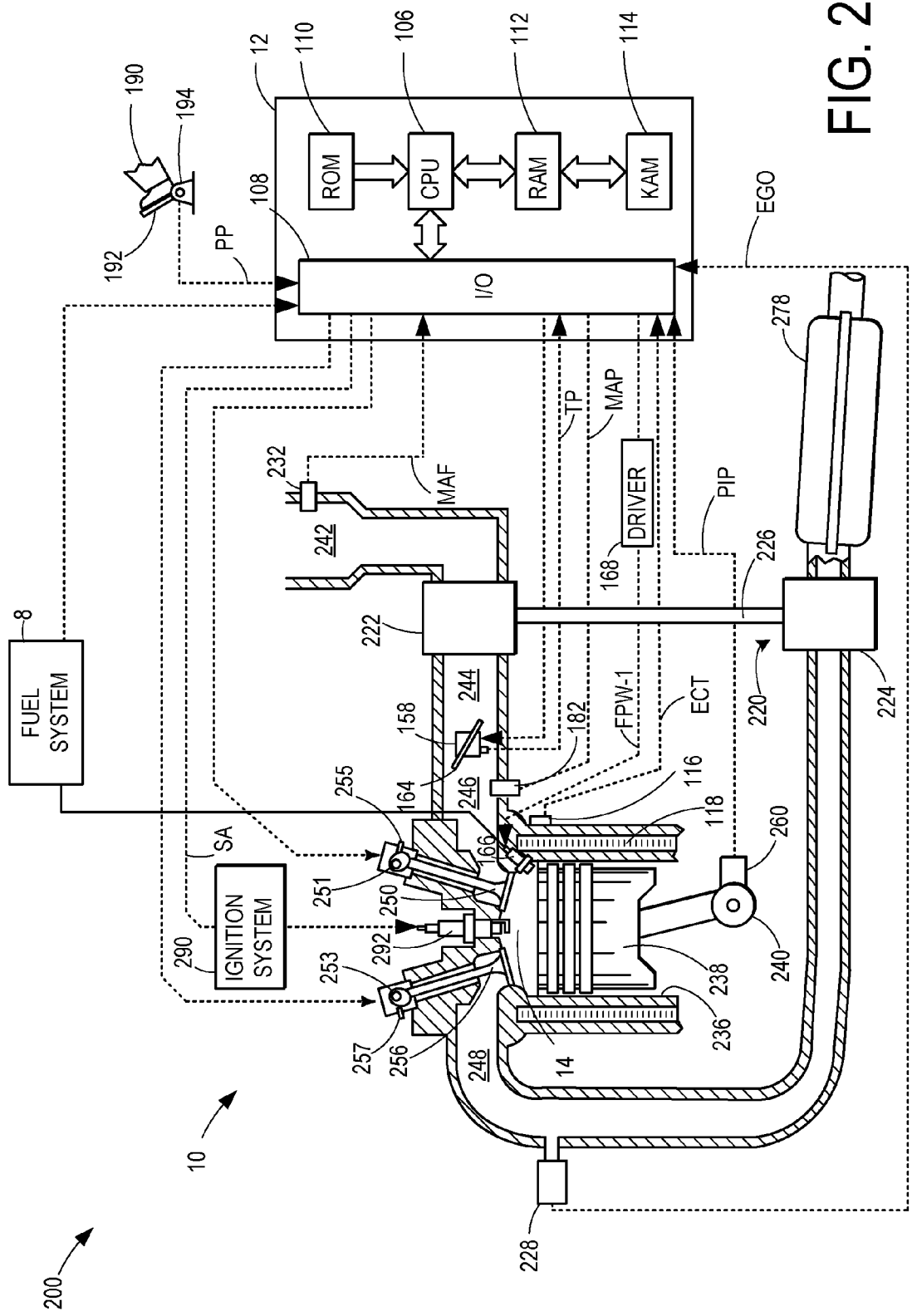
FIG. 2 shows a partial engine view.
Figure 3:
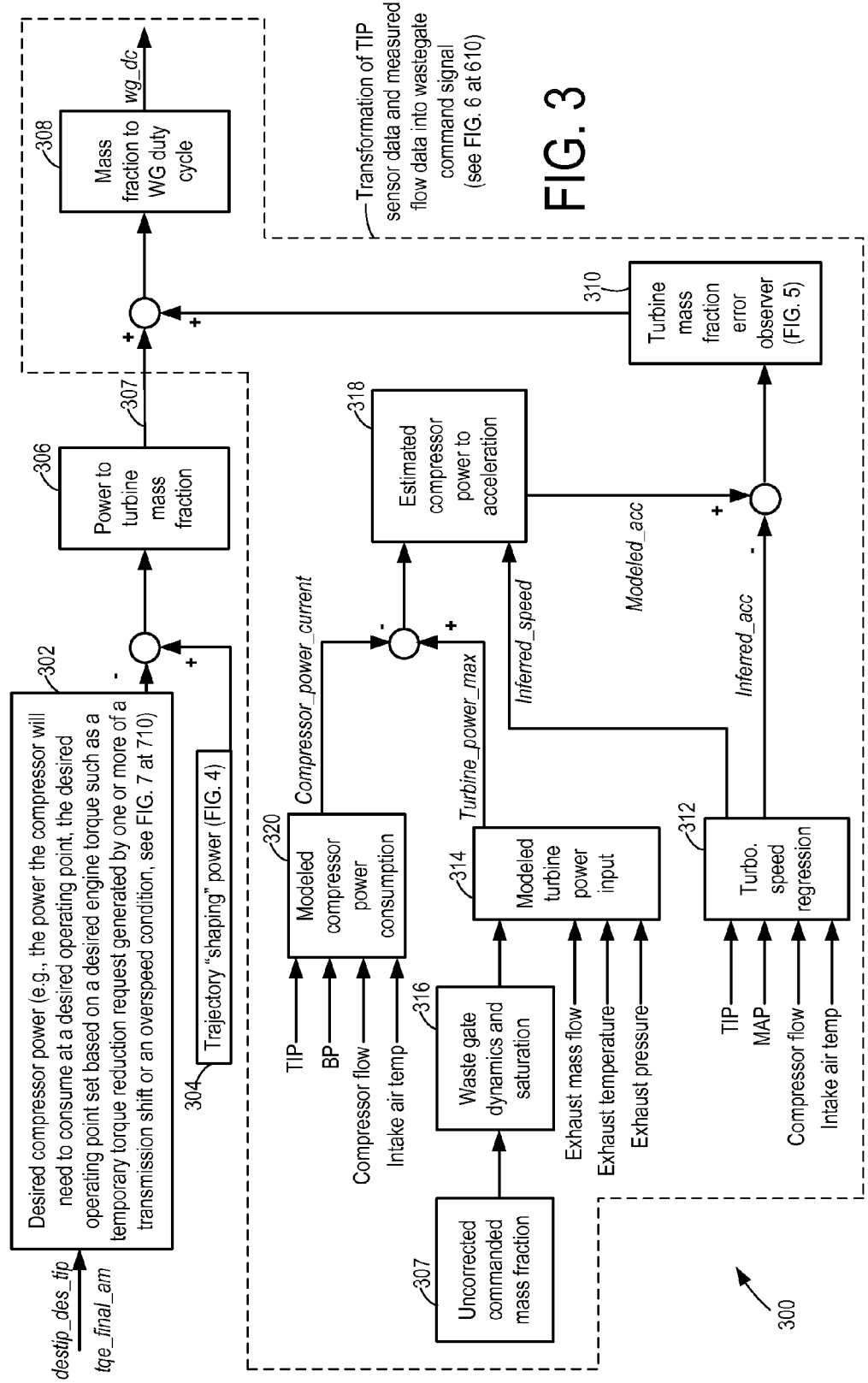
FIG. 3 shows a high level control block diagram depicting feed-forward and feedback controls of a turbocharger control method, according to the present disclosure.

The following description relates to methods for controlling a turbocharged engine, such as depicted in FIGS. 1-2, by adjusting the turbocharger (for example, via a wastegate position, a variable vane position, a variable nozzle position, etc.), and throttle concurrently. Using combined feedback and feed-forward control mechanisms, a turbocharger can be controlled while regulating the throttle inlet pressure. By using non-linear models of the turbocharger dynamic system and the engine airflow system, as depicted in FIG. 3, the measured throttle inlet pressure signal may be combined with measured airflow signals, to separate effects on throttle inlet pressure due to control errors and other conditions (that are addressed by the wastegate solenoid duty cycle control) from disturbances due to throttle movement or changes in throttle flow due to other factors such as engine speed or cam timing changes. An engine controller may perform example control routines, such as those elaborated with reference to FIGS. 4-5, to perform throttle adjustments and turbocharger control, to thereby adjust the turbocharger output. As such, the approach described herein enables better boost control and driveability response while retaining the ability to improve fuel economy by reducing throttling.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include an air cooler 154 and/or a throttle 158. The position of the throttle can be adjusted by the control system via a throttle actuator 157 communicatively coupled to controller 12. As shown in FIG. 1, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector. Further details of a single cylinder 14 are described below in FIG. 2.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122.

In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system.

Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 17 may be directed to the atmosphere via exhaust passage 170 while combustion products exhausted via exhaust passage 19 may be directed to the atmosphere via exhaust passage 180. Exhaust passages 170 and 180 may include one or more exhaust after-treatment devices, such as a catalyst, and one or more exhaust gas sensors, as further elaborated in FIG. 2.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 can include various other sensors. For example, each of intake passages 142 and 144 can include a mass air flow sensor (not shown). In some examples, only one of intake passages 142 and 144 can include a mass air flow (MAF) sensor. In some examples, intake manifold 160 may include an intake manifold pressure (MAP) sensor 182 and/or an intake manifold temperature sensor 183, each communicating with controller 12. In some examples, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Additional system sensors and actuators are elaborated below with reference to FIG. 2.

Engine 10 may receive control parameters from controller 12 and input from a vehicle operator 190 via an input device 192. In this example, input device 192 includes an accelerator pedal and a pedal position sensor 194 for generating a proportional pedal position signal PP. As further elaborated in FIGS. 4-6, in response to the input received from the vehicle operator, controller 12 can be configured to adjust the amount of boost provided by turbochargers 120 and 130, and thereby adjust TIP. In one example, controller 12 may achieve this by varying the position of throttle 158 by adjusting throttle actuator 157. In another example, controller 12 may achieve this by adjusting wastegates 128 and 138, to thereby adjust an amount of exhaust that bypasses turbines 124 and 134. In other example, controller 12 may achieve this by adjusting the vane position and/or nozzle position of a variable geometry turbine.

FIG. 2 depicts an example embodiment of a cylinder or combustion chamber of internal combustion engine 10. As previously indicated, engine 10 may receive control parameters from controller 12 and input from vehicle operator 190 via an input device 192, such as an accelerator pedal and a pedal position sensor 194 for generating a proportional pedal position signal PP. Cylinder (herein also "combustion chamber') 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. In some embodiments, one or more of the intake passages may include a boosting device such as a turbocharger 220. For example, FIG. 2 shows engine 10 configured with a turbocharger including a compressor 222 arranged between intake passages 242 and 244, and an exhaust turbine 224 arranged along exhaust passage 248. Compressor 224 may be at least partially powered by exhaust turbine 222 via a shaft 226 where the boosting device is configured as a turbocharger. A throttle 158 including a throttle plate 164 may be provided along an intake passage of the engine for varying the flow rate and/or pressure of intake air provided to the engine cylinders. For example, throttle 158 may be disposed downstream of compressor 222 as shown in FIG. 2, or alternatively may be provided upstream of the compressor.

Exhaust passage 248 can receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder. The valves of cylinder 14 may be deactivated via hydraulically actuated lifters coupled to valve pushrods, or via a cam profile switching mechanism in which a cam lobe with no lift is used for deactivated valves. In this example, deactivation of intake valve 250 and exhaust valve 256 may be controlled by cam actuation via respective cam actuation systems 251 and 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. In alternative embodiments, the intake and/or exhaust valve may be controlled by electric valve actuation. In one example, cylinder 14 may include an intake valve controlled via cam actuation including VCT systems and an exhaust valve controlled via electric valve actuation.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. However, in some embodiments, spark plug 292 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 232; engine coolant temperature (ECT) from temperature sensor 116 coupled to cooling sleeve 118; a profile ignition pickup signal (PIP) from Hall effect sensor 260 (or other type) coupled to crankshaft 240; throttle position (TP) from a throttle position sensor; and absolute manifold air pressure signal (MAP) from sensor 182. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 182 may be used to provide an indication of vacuum, or pressure, in the intake manifold. Further, as noted herein, manifold pressure may be estimated based on other operating parameters, such as based on MAF and RPM, for example.

As posed here, when actively controlling the turbocharger, the controller may have three states to control, namely, manifold pressure (MAP), throttle inlet pressure (TIP), and turbocharger speed. As such, MAP and TIP have relatively fast dynamics. In comparison, the turbocharger has a high inertia so that turbocharger speed is a slowly changing state. The PCM control output for the turbocharger includes a duty cycle to the wastegate solenoid. The wastegate duty cycle in turn affects the wastegate position, thereby affecting exhaust manifold pressure and mass flow through the turbocharger turbine. Other PCM control outputs for the turbocharger may include a vane position when the turbocharger is configured with a variable geometry turbine, and a nozzle position when the turbocharger is configured with a variable nozzle turbine. These have a direct impact on the turbine power and turbocharger speed and acceleration. Turbine power is also directly affected by the temperature and pressure of the exhaust gas flowing through the turbine. TIP is also affected by the above-mentioned states. In addition, TIP is affected by other active PCM control outputs, such as a throttle angle, such that changes in TIP are not consistently correlated to changes in wastegate duty cycle, vane position, nozzle position, or turbine mass flow.

As such, because of the confounding dynamic loops, one or more states could be away from a desired target, but the states will settle to the desired value without any control actions required. The state of TIP and MAP may be determined by respective sensors. Turbocharger speed, however, is not a measured signal, but may be inferred from other turbocharger parameters. In one example, turbocharger speed may be inferred based on measured and/or estimated pressures, temperatures, and flows through the compressor. Similarly, turbocharger acceleration may be inferred based on measured and/or estimated pressures, temperatures, and flows through the compressor, and their rates of change. The driveability of the vehicle may be degraded when TIP is less than a desired MAP, so an engine control system should be designed to avoid under-delivery of TIP, especially when the PCM has the ability to keep a compressor bypass valve closed such that the throttle can be unconstrained in its function to regulate engine airflow.

FIG. 3 describes an example high level control block diagram. The block diagram depicts feed-forward and feedback controls of a turbocharger control method 300. The feedback and feed-forward controls, based on non-linear and dynamic models, may be used by an engine controller to control the afore-mentioned states to balance turbocharger power, and thereby improve driveability in a turbocharged engine while achieving steady state fuel economy. While the depicted control method 300 illustrates turbocharger control by adjusting a wastegate position (via a wastegate solenoid duty cycle), this is not meant in a limiting sense. In alternate examples, additionally or optionally, a turbocharger vane and/or nozzle position may be adjusted to thereby adjust a turbocharger output.

As such, the turbocharger power balance represents the rate of change in turbocharger kinetic energy. This is equal to the difference between turbine power generation (work done by the exhaust gas) and compressor power consumption (work done to the intake air). When the power generated by the turbine and the power consumed by the compressor are equal, the turbocharger speed will not change, that is, there is no turbocharger acceleration. The turbocharger will speed up or slow down until there is a balance between power generation and consumption.

Thus, in one example, as described herein, feed-forward control of the wastegate is based on scheduling the turbine to produce the power the compressor will consume at the desired operating point, where the desired operating point is derived from the desired engine torque. The desired engine torque, in turn, is derived from the operator's pedal request. That is, the measured operator commands and operating data are transformed into the desired turbocharger power.

As depicted, based on a desired outlet pressure (destip_des_tip) and desired flow (tqe_final_am), an engine controller may calculate a desired compressor power 302 (compressor_power_desired), that is, the power the compressor will need to consume at the desired operating point (with the desired outlet pressure and flow). The desired engine operating point refers to the desired engine operating conditions (compressor flow, inlet and outlet pressures, inlet temperature) set based on the desired engine torque. The desired torque, as noted herein, may be based on an operator command, or various control system interventions such as transmission shift control, traction control, etc., as illustrated in FIG. 7, block 710. The maximum possible turbine power at current operating conditions is calculated to determine whether the desired compressor power can currently be generated. The turbine will need to produce this power to maintain this desired operating point.

Additional power data input fed-forward may include the trajectory "shaping" power 304. As further elaborated with reference to FIG. 4, the trajectory "shaping" power is the power required to achieve the desired turbocharger speed and acceleration trajectory toward the desired operating point. As explained further herein, this power is a function of the estimated exhaust temperature and pressures. A conversion of desired net power to turbine mass fraction 306 then ensues. That is, the controller calculates the mass flow through the turbine required to produce this power. The output of the conversion is an uncorrected commanded mass fraction 307. Mass fraction adjustments are then made based on feedback received from a turbine mass fraction error observer 310. Herein, as further explained below with reference to FIG. 5, the controller calculates what fraction of exhaust flow must go through the turbine to produce the desired power. As such, this is a function of the estimated total exhaust flow based on airflow and air-fuel ratio. Based on the adjusted mass fraction, a mass fraction to wastegate duty cycle 308 conversion is made. That is, the final output is observed as an adjusted wastegate duty cycle command (wg_dc).

As such, during the boosted conditions, stoichiometric combustion of fuel, including at least gasoline, may be carried out. In one example, the fuel may be gasoline. Alternatively, the fuel may be an alcohol blended gasoline, such as E85.

Due to potential errors in these feed-forward control blocks (for example, due to errors in estimations), additional feedback controls are included. For example, adjustments are made for turbocharger speed regression 312. As such, this is calculated as a function of TIP, MAP, compressor flow (e.g., intake air flow) and intake air temperature. The turbocharger speed regression 312, based on TIP, MAP, BP, compressor flow (e.g., intake air flow), and intake air temperature, is used to determine an expected or inferred turbocharger speed (inferred_speed) and inferred turbocharger acceleration (inferred_acc). The inferred turbocharger speed (inferred_speed) may also be based on a dynamic model of the torque balance, power balance, etc., of the turbocharger. Further still, turbocharger speed could also be measured if desired. For example, turbocharger speed may be measured using one or more sensors (such as pressure, temperature, and/or flow sensors). The inferred turbocharger acceleration (inferred_acc), that is, a rate of change of the inferred turbocharger speed, may be based on the torque balance and/or regression. The turbocharger acceleration may be computed based on the turbocharger speed. The estimates of turbine power generation and compressor power consumption are used to estimate net turbocharger power, which is combined with inferred turbocharger speed to calculate a predicted turbocharger acceleration.

Additional input is provided based on the modeled turbine power input 314, which is a function of exhaust mass flow, exhaust pressure and exhaust temperature. The modeled turbine power input 314 (turbine_power_max) refers to the maximum possible power that can be generated in the turbocharger for the current conditions. Additionally, the modeled turbine power input 314 is compensated with input from wastegate dynamics and saturation 316. This, in turn, is calculated as a function of the uncorrected commanded mass fraction 307 (that is output from the conversion of power to turbine mass fraction 306).

The system also calculates a modeled compressor power consumption 320 at the current operating point, (compressor_power_current). The current engine operating point herein refers to the current engine operating conditions (compressor flow, inlet and outlet pressures, inlet temperature). As illustrated, the modeled compressor power consumption 320 is calculated as a function of TIP, barometric pressure (BP), compressor flow, and intake air temperature. In this way, turbine power generation and compressor power consumption may be computed based on estimated and/or predicted efficiencies which are calculated as functions of gas temperatures, flow rates and pressures, along with inferred and desired turbocharger speed.

Using the estimates of desired compressor power 302, modeled compressor power consumption 320, and modeled turbine power input 314, an actual net turbocharger power (turbo_net_power_raw) is calculated, based on a difference between the turbine power generation and compressor power consumption. Specifically, the actual net turbocharger power is defined as: the minimum of (compressor_power_desired, and turbine_power_max) minus compressor_power_current. This is the actual net turbocharger power that will result by actuating to have the turbine generate the power the compressor will consume at the desired operating point. If the turbine continuously generates the power that the compressor will consume at steady-state desired conditions, the turbocharger will accelerate toward the desired operating point without over- or under-shoot.

The net turbocharger power, as calculated above, is then used to determine turbocharger acceleration through an estimated compressor power to acceleration 318 conversion. As such, the result represents modeled turbocharger acceleration (modeled_acc). The modeled acceleration and the inferred acceleration are used to calculate the turbine mass fraction error by the turbine mass fraction error observer 310.

As such, when desired airflow and TIP are increasing, it is possible that the required turbine flow to achieve equilibrium is more than the available exhaust flow. Thus, in the given model, using feed-forward and feedback loops, the controller forces TIP to match the desired TIP and forces the airflow to match the desired airflow. Since the rate of change of TIP is included in the calculations, the feedback mechanism forces the derivative of TIP to be zero, to thereby calculate zero TIP error.

By using feedback and feed-forward adjustments, the throttle can be moved during boosted conditions and the effects on the throttle inlet pressure can be separated out into a first portion corresponding to disturbances caused by the movement of the throttle, and a second, remaining portion. The turbocharger can then be adjusted based on the second portion, and not the first portion. When the throttle is positioned downstream of the turbocharger in the air inlet of the engine, the moving of the throttle may include moving the throttle away from wide open throttle conditions. In one example, the throttle may be temporarily moved away from wide open throttle conditions in response to temporary torque reduction request. The temporary torque reduction may be requested under conditions such a transmission shift, an overspeed condition, etc. Herein, by temporarily reducing the opening of the throttle, the engine controller may be able to temporarily reduce engine airflow while maintaining the boost pressure via maintenance of the wastegate position.

Further, during the boosted conditions, in addition to adjusting the turbocharger (for example, via the wastegate) and the throttle, the engine controller may temporarily open a compressor bypass around the compressor of the turbocharger. In this scenario, the effects on the throttle inlet pressure may be further separated out into a third portion corresponding to disturbances caused by the opening of the compressor bypass, and a fourth remaining portion. Herein, the turbocharger may be further adjusted based on the fourth portion and not the third portion. Specifically, the various effects may be separated out by transforming throttle inlet pressure sensor data, throttle position sensor data, and measured flow data into a PCM control output for the turbocharger, such as a wastegate command signal that is sent to the wastegate, as illustrated in FIG. 6, block 610. The wastegate may be further adjusted based on a trajectory of the turbocharger speed.

In this way, the various effects on the throttle inlet pressure (TIP), for example those caused by the movement of the throttle and those caused by flow through a compressor bypass, can be separated out from the remaining portion of the effects, and boost adjustments can be performed by modulating the turbocharger dynamics based on one or more of the separated effects (for example, based on the remaining portion and not based on the effects caused by the throttle movement or compressor bypass flow). Then, both the throttle and the turbocharger may be concurrently adjusted to control engine output in response to the operating conditions. In this way, the throttle and turbocharger can be adjusted concurrently, independent of each other, without either one adversely affecting the adjustments of the other.

As one example, if the turbocharger control involved TIP feedback control of the wastegate, then the throttle would be positioned and maintained at wide-open throttle conditions. Herein, if during engine operation the throttle moves away from wide-open throttle, (for example, due to a driver tip out) a TIP error is generated by the throttle, causing the controller to open the wastegate to reduce boost. However, if it is a temporary tip out, (for example, the driver tips right back in), there is a big delay because the boost must be built up again. In comparison, in the turbocharger control method of the present disclosure, the controller can keep the turbocharger boost present, and just reduce torque temporarily with throttle adjustments. Then during driver tip-in, the throttle can be used to regain higher airflow. Since throttle adjustments are enable a faster response, no delay is caused because the throttle was used to reduce airflow while maintaining the boost before the driver tip-in.

Figure 4:
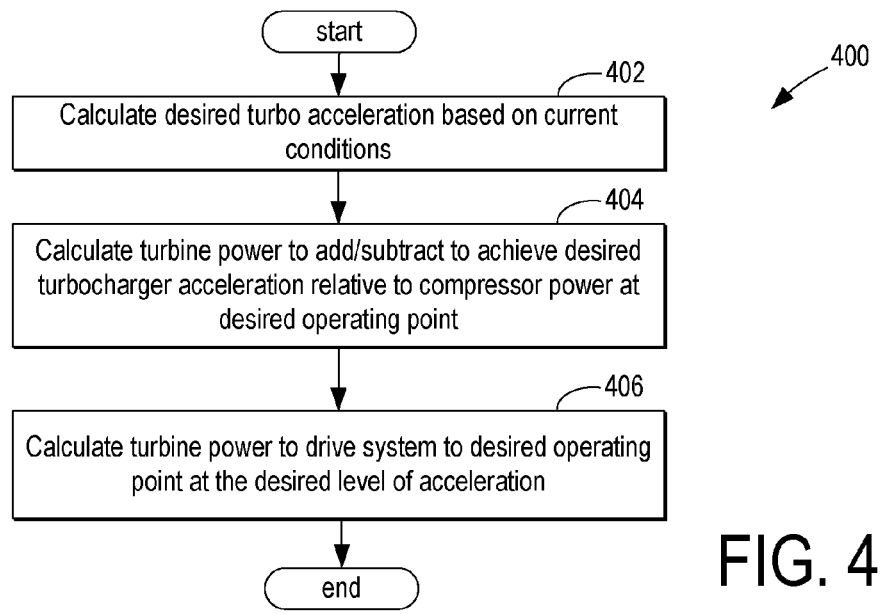
FIGS. 4-5 show high level flow charts for controlling a turbocharger boost using concurrent throttle and wastegate adjustments, according to an embodiment of the present disclosure.
Figure 5:
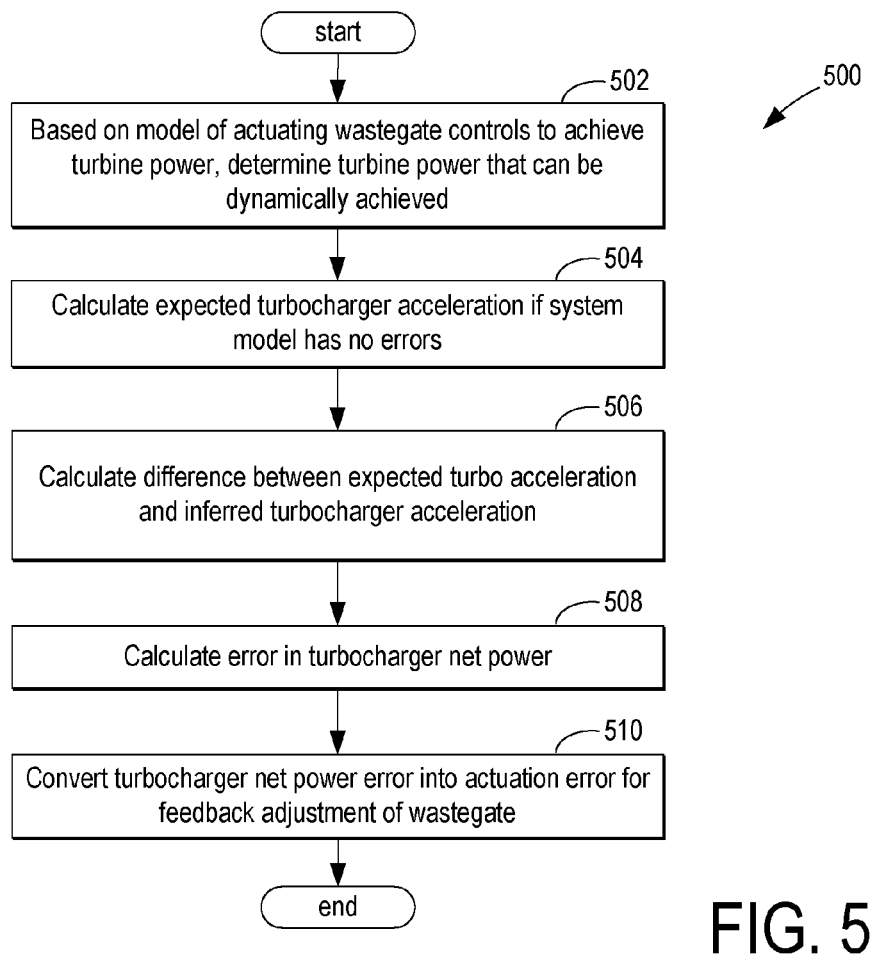

FIGS. 4-5 describe example routines for carrying out the turbocharger control approach illustrated and described with respect to FIG. 3 involving wastegate adjustments.

Turning first to FIG. 4, a routine 400 is described for determining a turbocharger power trajectory, as may be used as part of method 300 (at 304) to calculate a final wastegate command. The turbocharger shaping allows modification, via adjustment of the wastegate, for example, of the turbocharger speed trajectory during transient conditions. The shaping may include additional controller action to modify the turbo acceleration response (for example, slowing the decrease of turbocharger response down to target, or speeding up the turbocharger response up to target) based on the inferred and expected turbocharger speed and acceleration.

At 402, the desired turbocharger acceleration may be calculated based on the current operating conditions and the acceleration that would result by having the turbine generate the power for the desired operating conditions. These operating conditions may include, for example, a compressor flow, a manifold pressure, barometric pressure, throttle inlet pressure, inlet temperature, etc. At 404, the routine calculates an amount of turbine power that may need to be added or subtracted to achieve the desired turbocharger acceleration relative to a compressor power at the desired operating point. It is important to consider that if the pressure upstream of the throttle is higher than the desired intake manifold pressure, the throttle can be used to deliver the desired pressure. This would correspond to the turbocharger being above desired speed during steady operating conditions. As a result, if the turbocharger is above desired speed the throttle has control authority but the throttle may not have authority to achieve desired intake manifold pressure if the turbocharger is below desired speed. As a result, the control system could be structured to have the turbocharger more rapidly approach desired speed when below a target and more gradually approach desired speed when above the target. For example, if the turbocharger is below a desired speed, the control system may be calibrated to increase the level of turbocharger acceleration.

At 406, the routine calculates a turbine power needed to drive the engine system to the desired operating point at the desired level of acceleration. In this way, a trajectory for shaping the desired turbocharger power may be determined.

Now turning to FIG. 5, a routine 500 is described for determining a feedback adjustment for the turbocharger power and acceleration control, as may be used as part of method 300 (at 310) to calculate a final wastegate command.

At 502, based on the model of actuating wastegate controls to achieve turbine power (as previously elaborated in FIG. 3 in 314 and 316), the routine may determine how much turbine power can be dynamically achieved under the given operating conditions along with the current compressor power consumption in 320. Next, at 504, the routine calculates an expected turbocharger acceleration, assuming the system model has no errors (at 318 in FIG. 3). At 506, a difference between the expected turbocharger acceleration (from 318 in FIG. 3) and the inferred turbocharger acceleration (from 312) is calculated (the input provided to 310 in FIG. 3). At 508, an error in turbocharger net power is calculated, for example, based on the difference calculated at 506. At 510, the turbocharger net power error is converted into an actuation error for feedback adjustment of the wastegate (at 310 in FIG. 3). For example, when an error in turbocharger pressure and/or flow (corresponding to an error in turbocharger power) is greater than a threshold, an engine controller may temporarily slow a decrease in throttle inlet pressure by further adjusting the wastegate and/or adjusting the actuation of a variable geometry turbine.

While FIGS. 3-5 depict controlling a turbocharger operation by adjusting the wastegate (for example, using wastegate solenoid commands), it will be appreciate that additionally or optionally, the controller may adjust the actuation of a variable geometry turbine of the turbocharger. This may include, for example, adjusting a vane position when the turbocharger includes a variable vane turbine, and adjusting a nozzle position when the turbocharger includes a variable nozzle turbine.

In this way, a control of the turbocharger and engine airflow may be structured such that both throttle adjustment and turbocharger adjustments (for example, wastegate actions) are coordinated to one another and do not counteract each other. Since the estimated turbine power generation includes exhaust pressure, flow and temperature, sudden changes in these parameters (due to spark retard during a shift, for example) produce the expected turbocharger acceleration and this is not considered an error in the actuation of mass fraction of flow through the turbine.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a turbocharged engine having a throttle and an adjustable turbocharger, via a controller and sensors, comprising,
moving the throttle during boosted conditions;
separating out effects on a throttle inlet pressure into a first portion corresponding to disturbances caused by throttle movement, and a second, remaining, portion corresponding to disturbances caused by engine speed and cam timing changes; and
adjusting the turbocharger based on the second portion and not the first portion.

2. The method of claim 1 wherein adjusting the turbocharger includes at least one of adjusting a turbocharger wastegate, adjusting a vane position when the turbocharger includes a variable vane turbine, and adjusting a nozzle position when the turbocharger includes a variable nozzle turbine.

3. The method of claim 2, wherein the throttle is positioned downstream of a turbocharger in an air inlet of the engine, and where moving of the throttle includes moving the throttle away from wide open throttle conditions.

4. The method of claim 3, wherein the moving of the throttle includes temporarily reducing opening of the throttle to temporarily reduce engine airflow, while maintaining boost pressure via maintenance of wastegate position.

5. The method of claim 3, further comprising carrying out stoichiometric combustion of a fuel, including at least gasoline, in the engine during boosted conditions.

6. The method of claim 5, wherein the separating out effects includes transforming throttle inlet pressure sensor data and measured flow data into a wastegate command signal sent to the wastegate.

7. The method of claim 1, wherein the throttle is moved in response to a temporary torque reduction request generated by one or more of a transmission shift or an overspeed condition.

8. The method of claim 1, further comprising adjusting the turbocharger based on a desired trajectory of a turbocharger speed.

9. A method of controlling a turbocharged engine having a throttle and a wastegate, via a controller and sensors, comprising,
during a boosted condition:
adjusting the throttle;
transforming measured operating data into an estimate of actual turbocharger power and acceleration; and
adjusting the wastegate in response to a desired turbocharger power, and an actual turbocharger power trajectory and speed trajectory, the speed trajectory based on turbocharger acceleration.

10. The method of claim 9, further comprising, transforming measured operator commands and operating data into the desired turbocharger power.

11. The method of claim 10, wherein the desired turbocharger power generates a desired pressure and flow for a given operating point.

12. The method of claim 11, further comprising, when an error in turbocharger pressure and/or flow is greater than a threshold, temporarily slowing a decrease in throttle inlet pressure by further adjusting the wastegate.

13. A system, comprising:
an engine having an adjustable turbocharger and a throttle;
a non-transitory computer readable storage medium of a controller having instructions encoded thereon, including:
instructions for, during a boosted condition, moving the throttle;
instructions for, during said boosted condition, adjusting the turbocharger in response to a throttle inlet pressure, a desired turbocharger power, and an actual turbocharger power trajectory and speed trajectory, including turbocharger acceleration, said adjusting including separating out effects on the throttle inlet pressure into a first portion corresponding to disturbances caused by movement of the throttle, and a second, remaining, portion, said turbocharger adjusted based on the second portion and not the first portion; and
instructions for transforming measured operating data into an estimate of actual net turbocharger power and acceleration, the estimate of actual net turbocharger power based on a difference between turbine power generation and compressor power consumption.

14. The system of claim 13 wherein adjusting the turbocharger includes at least one of adjusting a wastegate, adjusting a vane position when the turbocharger includes a variable vane turbine, and adjusting a nozzle position when the turbocharger includes a variable nozzle turbine.

15. The system of claim 13, further comprising, instructions for transforming measured operator commands and operating data into the desired turbocharger power.

16. The system of claim 15, wherein the desired power generates a desired pressure and flow for a given operating point.

17. The system of claim 16, further comprising, instructions for, when an error in turbocharger pressure and/or flow is greater than a threshold, temporarily slowing a decrease in throttle inlet pressure by further adjusting the wastegate.

18. The system of claim 13, further comprising, instructions for inferring turbocharger speed based on measured and/or estimated pressures, temperatures and flows through the compressor.

19. The system of claim 18, further comprising, instructions for inferring turbocharger acceleration based on measured and/or estimated pressures, temperatures and flows through the compressor and their rates of change.

20. The system of claim 19, wherein inferring turbocharger speed includes measuring turbocharger speed using one or more sensors, and wherein inferring turbocharger acceleration includes computing turbocharger acceleration based on the measured turbocharger speed.

* * * * *